United States Patent
McMillan

[11] Patent Number: 5,895,211
[45] Date of Patent: Apr. 20, 1999

[54] METHOD AND DEVICE FOR SUPPLYING A GASEOUS FUEL TO A PREMIXING BURNER

[75] Inventor: Robin McMillan, Untersiggenthal, Switzerland

[73] Assignee: Asea Brown Boveri AG, Baden, Switzerland

[21] Appl. No.: 08/566,954

[22] Filed: Dec. 4, 1995

[30] Foreign Application Priority Data

Dec. 27, 1994 [DE] Germany ................ 44 46 842

[51] Int. Cl.⁶ ........................................ F23M 3/04
[52] U.S. Cl. ...................... 431/10; 431/12; 431/354; 60/733; 48/180.1; 48/189.4
[58] Field of Search ............... 431/10, 12, 354, 431/284; 60/733, 746; 48/180.1, 189.3, 189.4, 189.5, 189.6

[56] References Cited

U.S. PATENT DOCUMENTS

| Re. 12,293 | 12/1904 | Gwynn | 431/354 |
|---|---|---|---|
| 1,466,795 | 9/1923 | Gibson | 48/189.3 |
| 3,914,091 | 10/1975 | Yanagishi et al. | 431/10 |
| 4,761,132 | 8/1988 | Khinkis | 431/12 |
| 4,781,030 | 11/1988 | Hellat et al. | 431/350 |
| 4,910,957 | 3/1990 | Moreno et al. | 60/746 |
| 4,932,861 | 6/1990 | Keller et al. | 431/284 |
| 5,016,443 | 5/1991 | Shimizu et al. | 60/746 |
| 5,453,004 | 9/1995 | Hofbauer | 431/12 |
| 5,482,457 | 1/1996 | Aigner et al. | 431/10 |
| 5,489,203 | 2/1996 | Dobbeling et al. | 431/284 |

FOREIGN PATENT DOCUMENTS

| 0187441 | 7/1986 | European Pat. Off. |
| 9000960 | 5/1990 | Germany |

Primary Examiner—Carroll B. Dority
Attorney, Agent, or Firm—Burns, Doane, Swecker & Mathis, L.L.P.

[57] ABSTRACT

A gaseous fuel (B) is fed to a a premixing burner which has a main line (10) for the feed of oxygenous gas (G) into at least one mixing zone and/or a combustion zone (VMZ, EMZ, VZ). In the process, at least a first portion of the fuel is fed to the main line (10), in which it is mixed with oxygenous primary gas (PG) inside at least one premixing zone (VMZ) and forms a premixture. The concentration of the fuel in the premixture (VM), under the respective operating conditions of the burner, is selected in such a way that the premixture lies outside the ignition limit. The premixture (VM) is fed to a final mixing zone (EMZ) and is mixed therein with the residual fuel (RB) likewise supplied and/or with oxygenous secondary gas (SG). The resulting final mixture (EM) is fed to a following combustion zone (VZ).

13 Claims, 3 Drawing Sheets

METHOD AND DEVICE FOR SUPPLYING A GASEOUS FUEL TO A PREMIXING BURNER

BACKGROUND OF THE INVENTION

1. Field of the Invention

The invention relates to a method of feeding a gaseous fuel into a premixing burner which has a main line for the feed of oxygenous gas into at least one mixing zone and/or a combustion zone, at least a first portion of the fuel being fed to the main line, in which it is mixed with oxygenous primary gas inside at least one premixing zone and forms a premixture, as well as to a device for carrying out the method. Such a method and a device for carrying it out have been disclosed, for example, by specification EP-A-0 187 441.

2. Discussion of Background

It is generally known in the case of premixing burners to mix the gaseous fuel and/or the combustion air with one another in two or more stages. In the process, for example, a portion of the air necessary for the complete combustion of the fuel is mixed with the fuel inside a mixing zone and is supplied to a subsequent combustion zone (see, for example, specification EP-A-0 187 441). However, it is also possible to first mix a portion of the fuel with a portion of the combustion air. The ignition normally takes place directly after the discharge of the mixture from the premixing zone, i.e. the composition of the fuel/primary-air mixture is selected in such a way that it lies within the ignition limits. The residual air and if need be the residual fuel are fed directly to the flame.

Here, good intermixing of the gas flows is important in order to avoid NOx emissions. Local fluctuations in the fuel/air concentration lead inevitably to higher NOx production.

In the known methods, good intermixing of fuel and air inside the mixing zone is not always guaranteed, e.g. since the length of the mixing zone often has to remain limited for constructional reasons. Flow baffle plates, inter alia, in the mixing zone are used as an aid, which flow baffle plates are intended to promote intermixing of the flow media. However, the fitting of such baffle plates means additional effort during the construction and in addition leads to unwanted pressure losses.

In addition, there is always the risk of flashback within the mixture feedline to the combustion zone and also in the premixing zone. So-called "flame retention baffles" serve as a conventional measure to help solve this problem. The use of such mechanical flame retention baffles again involves additional constructional effort, and there is always a risk left to contend with. In addition, the mechanical flame retention baffles are exposed to extremely high thermal loads, which often leads to the flame retention baffles becoming worn or sometimes breaking loose. These parts could then put other parts located further downstream at risk, such as, for example, turbine blades.

The so-called premixing burners of the double-cone type of construction may be designated as flame-retaining burners which do not need mechanical flame retention baffles. Such double-cone burners are disclosed, for example, by U.S. Pat. No. 4,932,861 to Keller et al. and will be described later with reference to FIGS. 3 and 4. The fuel, gas in this case, is injected in the inlet gaps via a row of injector nozzles into the flow of combustion air coming from the compressor. As a rule, these injector nozzles are uniformly distributed over the entire gap.

In order to achieve reliable ignition of the mixture in the downstream combustion chamber and satisfactory burn-up, intimate mixing of the fuel with the air is necessary. Good intermixing also helps to avoid so-called hot spots in the combustion chamber, which lead, inter alia, to the formation of unwanted $NO_x$.

It would also be possible in principle for a portion of the air required for the combustion to be fed into the fuel line upstream in order to achieve a type of premixing along the fuel line. However, in many applications of the premixing burners, such as, for example, inside the combustion chambers of gas turbines, the pressure in the air line is considerably lower than the pressure in the fuel line. Consequently, the combustion air would have to be highly compressed again during such feeding, which would mean considerably increased mechanical complexity. The consequence of this would in turn be that virtually only a small portion of air could be mixed with the fuel in this way—despite the considerable complexity—so that a satisfactory solution to the problem would still not be guaranteed.

SUMMARY OF THE INVENTION

Accordingly, one object of the invention is to provide a novel method of feeding a fuel into a premixing burner. A device for carrying out the method according to the invention is also proposed.

Advantageous embodiments of the method according to the invention and of the device are described in the subclaims Substantially improved intermixing is achieved by virtue of the fact that the concentration of the fuel in the premixture, under the respective operating conditions of the burner, is selected in such a way that the premixture lies outside the ignition limit, and the premixture is fed to a final mixing zone and is mixed therein with the residual fuel likewise supplied and/or with oxygenous secondary gas, and the resulting final mixture is fed to a following combustion zone. The composition of the premixture provides for the requisite safety against flashback.

The novel device has the advantage of simplicity In contrast to the device mentioned at the beginning according to EP-A-0 187 441, a plurality of housings and lines are not required in the case of the novel device. In principle, the device may consist of only one housing for operation with both high calorific value fuel and low caloriffic fuel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements essential for understanding the invention are shown. Not shown, for example, are the complete combustion chamber and its allocation to a plant, the provision of the fuel, the control equipment and the like. The direction of flow of the working media is designated by arrows.

DESCRIPTION OF THE PREFERRED EMBODIMENTS

Figure 1A:
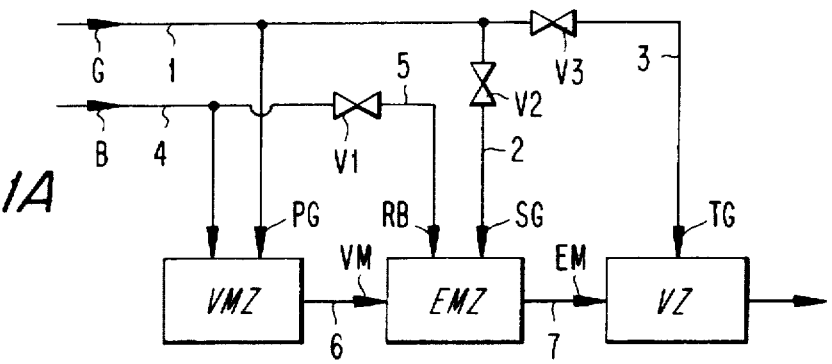
FIG. 1A shows a scheme of the general principle.

Referring now to the drawings, wherein like reference numerals designate identical or corresponding parts throughout the several views, the principle of the method according to FIG. 1A is applied in a premixing burner which essentially has a premixing zone VMZ, a final mixing zone EMZ and a combustion zone VZ. At least a first portion of a gaseous fuel B is fed to the premixing burner via a feed line 4. Via a main line 1, oxygenous gas G, air in the example, is fed in the form of primary gas PG to the premixing zone VMZ. A premixture VM is formed in the premixing zone VMZ. The concentration of fuel in the premixture VM, under the respective operating conditions of the burner, is selected in such a way that the premixture lies outside the ignition limit. Depending on the fuel used, the premixture may be too rich as well as too lean. If a fuel of low calorific value is used, the concentration of the fuel in the premixture lies above the ignitability limit. The mass proportion of the fuel in the premixture is between about 50 and 100%. On the other hand, if a fuel of high calorific value is used, the concentration of fuel in the premixture lies below the ignitability limit. The mass proportion of the fuel in the premixture in this case is between about 0 and 2.2%. It will be understood that these figures are only reference values, the exact values depend on the gas type, on the combustion-air temperature and pressure at the burner inlet, and on the gas temperature and the air velocity in the burner.

The premixture VM is then fed to a final mixing zone EMZ and is mixed therein either with the residual fuel RB likewise supplied and/or with oxygenous secondary gas SG. The resulting final mixture EM is fed to a following combustion zone VZ. If necessary, an oxygenous tertiary gas TG may also be fed to the combustion zone VZ.

Figure 1B:
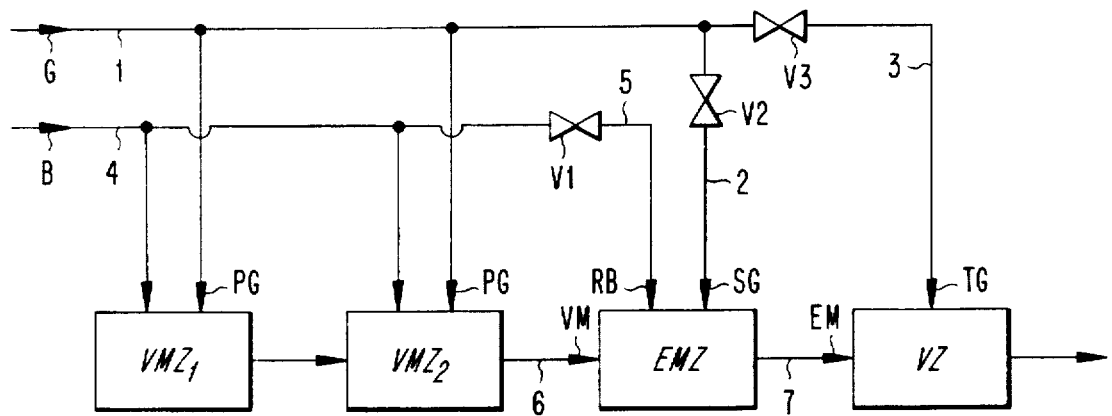
FIG. 1B shows a schematic as in FIG. 1A in which two premixing chambers are arranged in series.
Figure 1C:
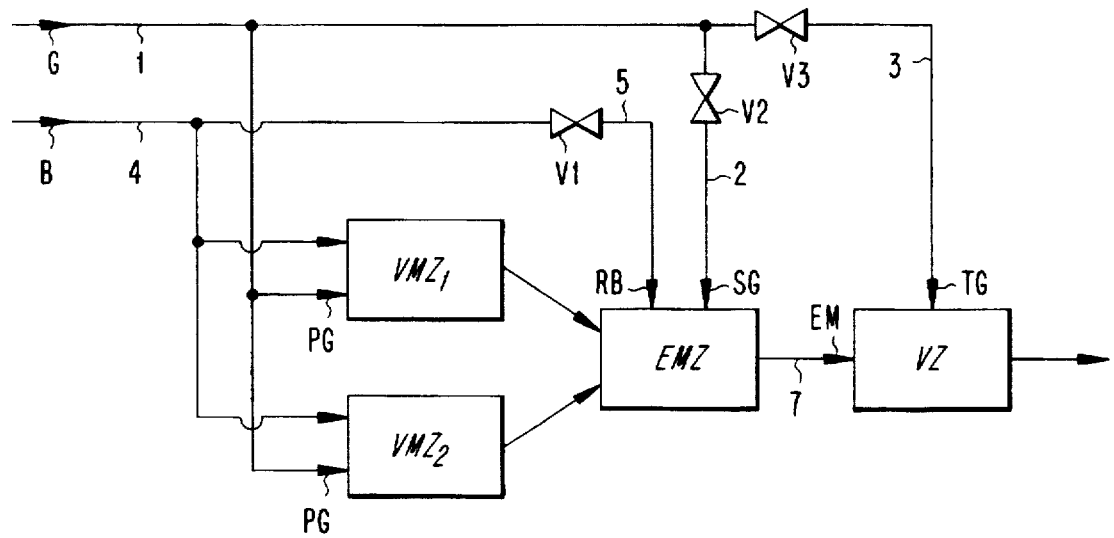
FIG. 1C shows a schematic as in FIG. 1A in which two premixing chambers are arranged in parallel.

It will be understood that, in this way, a plurality of premixing zones may be present in series or parallel connection. FIG. 1B shows a schematic of the invention in which two premixing chambers VMZ$_1$ and VMZ$_2$ are arranged in series, with VMZ$_1$ feeding a mixture into VMX$_2$, which then feeds the resulting mixture into the final mixing chamber EMZ. FIG. 1C is a schematic of the invention in which two premixing chambers, VMZ$_1$ and VMZ$_2$, are connected in parallel to both feed directly into the final mixing chamber EMZ.

Figure 2:
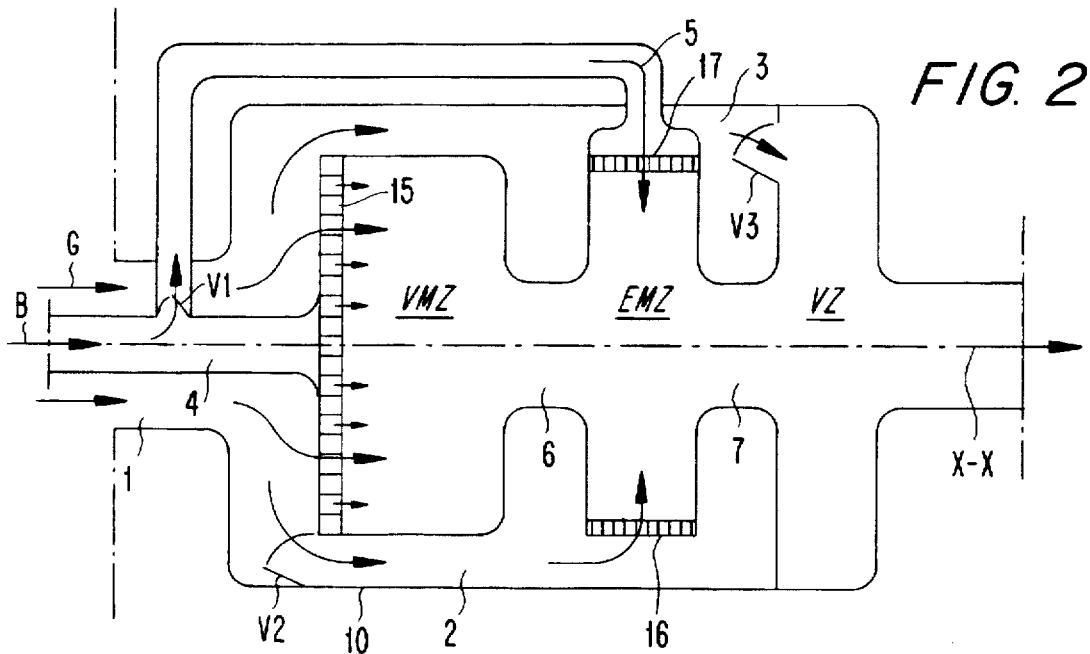
FIG. 2 shows a device in schematic representation.

A schematic device for carrying out the method is shown in FIG. 2. The main line 1 for the feed of air into the mixing zones VMZ and EMZ and into the combustion zone VZ of the premixing burner leads into a housing 10 having a longitudinal axis X—X. First feed means for feeding fuel into the premixing zone VMZ are designated by 4. This involves the feeding of fuel into a nozzle plate 15 arranged perpendicularly to the longitudinal axis. The combustion air passes via the line 1 into the housing 10 above the nozzle plate 15.

Second feed means 6 arranged inside the housing 10 serve to transmit the premixture VM from the premixing zone VMZ into a final mixing zone EMZ. Third feed means 5, 17 and 2, 16 respectively arranged at least partly inside the housing 10 serve to feed residual fuel RB and air SG into the final mixing zone EMZ. To this ends the fuel line 5 branches off from the line 4. It can be closed by means of a shut-off member V1 and directs the fuel into the discharge nozzles 17, which here lead into the final mixing zone transversely to the direction of flow of the mixture. If air is likewise supplied to the final mixing zone EMZ, this air passes via discharge nozzles 16 into the final mixing zone via a line 2 branching off from the air line 1. This line 2 can also be closed by means of a shut-off member V2.

The prepared mixture passes from the final mixing zone EMZ via a transfer section 7 into the downstream combustion zone VZ. An additional passage 3 which can be shut off by means of shut-off member V3 is provided for feeding a third flow of air TG into the combustion zone VZ.

The following processes can be realized with this device.

When shut-off member V1 is closed and shut-off member V2 is opens all the fuel and a portion of the air is fed to the premixing zone VMZ. This mode of operation is selected in the case of a fuel of low calorific value, the mass proportion of the fuel in the premixture being between about 50 and 100%.

When shut-off member V1 is open and shut-off member V2 is closed, all the air and only a portion of the fuel is fed to the premixing zone VMZ. The residual fuel is fed to the final mixing zone EMZ. This mode of operation is selected in the case of a fuel of high calorific values the mass proportion of the fuel in the premixture being between 0 and 2.2%.

A mode of operation with open shut-off members V1 and V2 may of course also be selected.

All modes of operation may be supplemented by the feeding of tertiary air TG into the combustion zone VZ by corresponding opening of the shut-off member V3.

Figure 4:
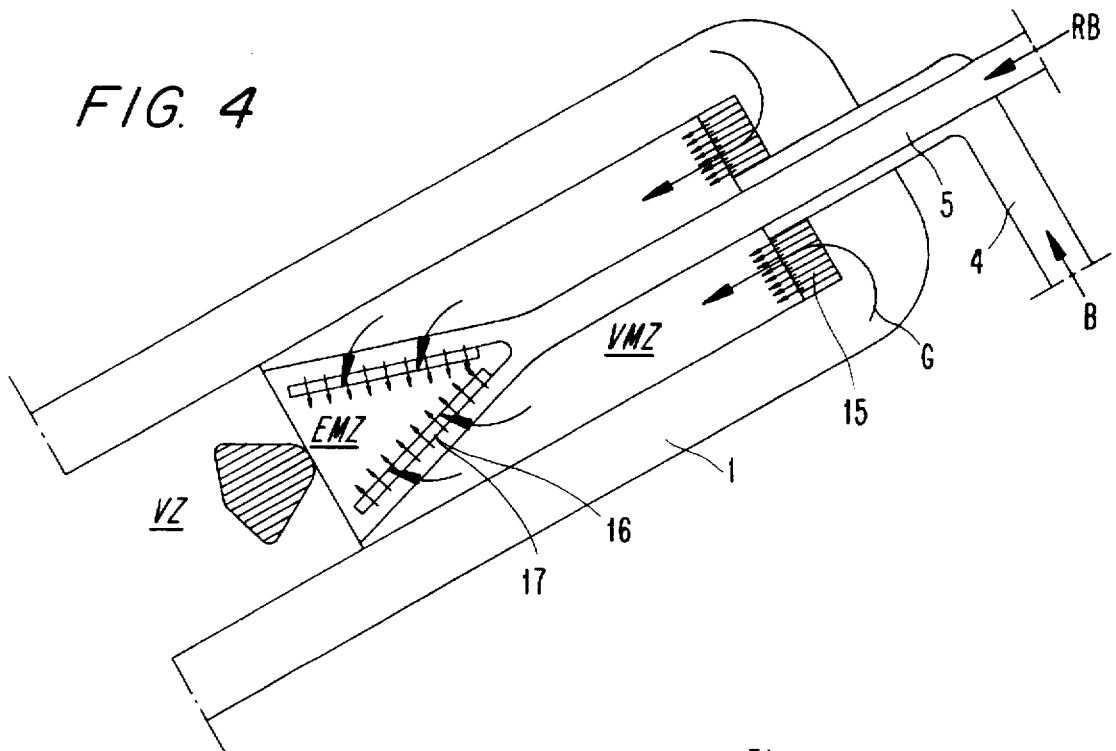
FIG. 4 shows a partial longitudinal section of a combustion chamber which is operated with fuel of low calorific value.
Figure 3:
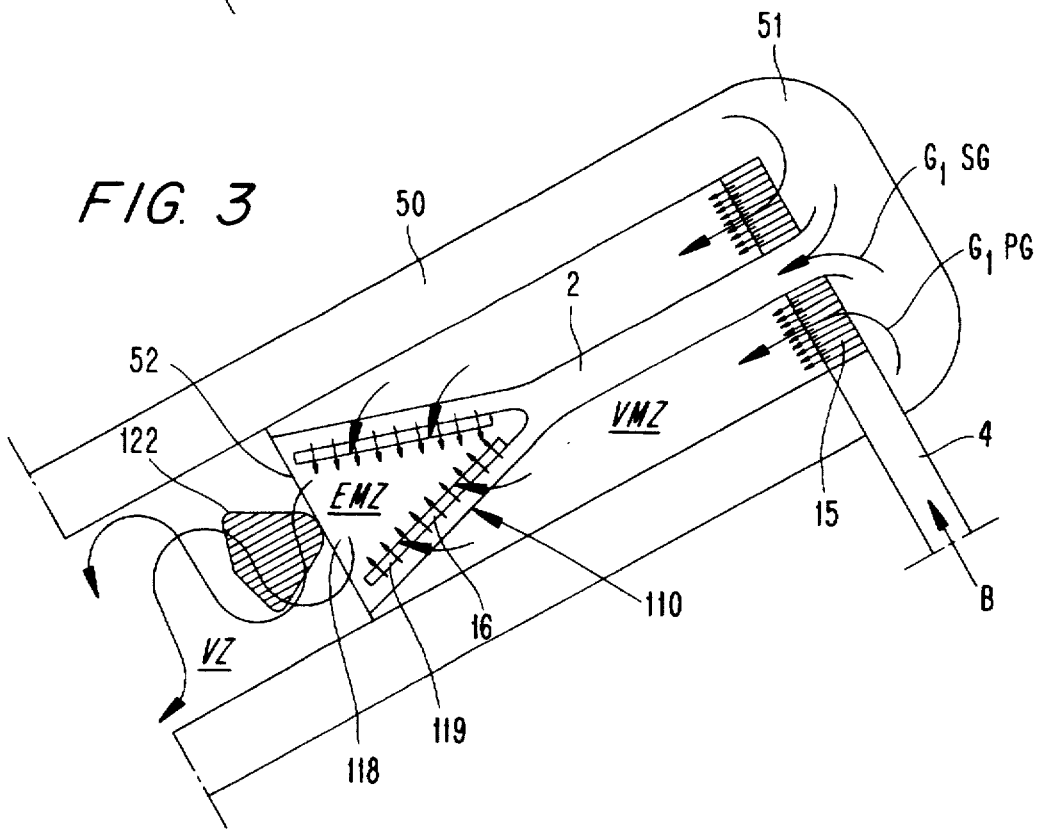
FIG. 3 shows a partial longitudinal section of a combustion chamber which is operated with fuel of high calorific value.

FIGS. 3 and 4 show two exemplary embodiments of combustion chambers which are conceived for fuel of low calorific value on the one hand and for fuel of high calorific value on the other hand.

In FIG. 3, an encased plenum is designated by 50, which as a rule receives the combustion air delivered by a compressor (not shown) and feeds it to a combustion chamber. A dome 51 is mounted on the combustion chamber, the combustion space VZ of which is defined by a front plate 52 having air openings discharging into the combustion chamber. A burner 110 is arranged in this dome in such a way that the burner discharge 118 is at least approximately flush with the front plate 52. The combustion chamber may be both an annular combustion chamber and a cylindrical silo combustion chamber. The case shown could be an annular combustion chamber, which means that a plurality of burners 110 are arranged uniformly next to one another or mutually offset in a distributed manner over the periphery on the annular front plate 52.

According to FIG. 3, the combustion air flows out of the plenum 50 into the dome interior. The main portion PG passes through the nozzle plate 15 into the premixing zone VMZ. All the fuel, in this case a fuel of low calorific value, passes via the feed line 4 into the nozzle plate, from which it is injected into the premixing zone. As a result, a rich mixture is obtained which cannot ignite. This premixture is then supplied to the final mixing zone EMZ. In the present examples the aforesaid burners 110 perform the function of final mixing.

Figure 5B:
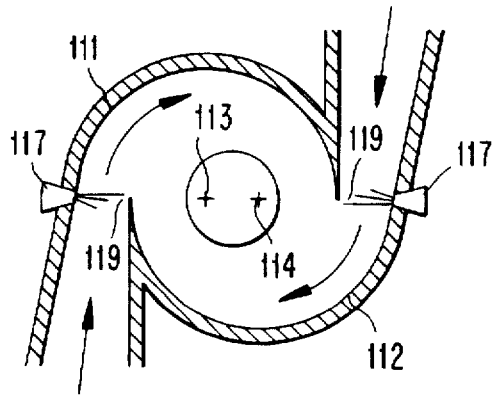
FIG. 5B shows a cross-section through the same premixing burner in the region of the cone tip.
Figure 5A:
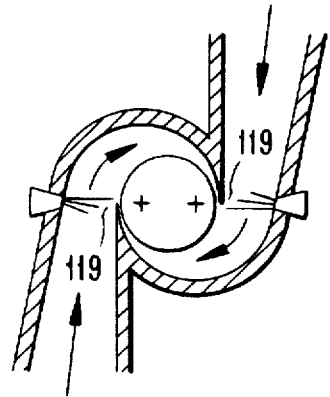
FIG. 5A shows a cross-section through a premixing burner of the double-cone type of construction in the region of its discharge.

The premixing burner 110 schematically shown in FIGS. 3 and 5 is a so-called double-cone burner as disclosed, for example, by U.S. Pat. No. 4,932,861 to Keller et al. It essentially comprises two hollow, conical sectional bodies 111, 112 which are nested one inside the other in the direction of flow. In this arrangement, the respective center axes 113, 114 of the two sectional bodies are mutually offset. The adjacent walls of the two sectional bodies form slots 119, tangential in their longitudinal extent, for the premixture, which in this way passes into the burner interior.

The line 2 starting from the dome 51 is provided for the feed of the secondary air SG. Inflow openings 117 distributed in the longitudinal direction in the region of the tangential slots 119 in the walls of the two sectional bodies are provided in the burner 110. The final mixture formation with the premixture therefore already starts in the zone of the inlet slots 119.

A homogeneous fuel concentration appears at the burner discharge 118 over the annular cross section acted upon. A defined calotte-shaped backflow zone 122 develops at the burner discharges at the tip of which backflow zone 122 the ignition is effected. Double-cone burners have been disclosed up to this point by U.S. Pat. No. 4,932,861 to Keller et al. mentioned at the beginning.

In the exemplary embodiment according to FIG. 4, the combustion air likewise flows out of the plenum 50 into the dome interior. Here, all the air quantity G passes through the nozzle plate 15 into the premixing zone VMZ. A portion B of the fuel, in this case a fuel of high calorific value, passes via the feed line 4 into the nozzle plate, from which it is injected into the premixing zone. In the process, a lean mixture is produced which likewise cannot ignite. This premixture is then supplied to the final mixing zone EMZ, which function is again performed by the aforesaid burner 110.

The lean premixture flows via the tangential slots of the burner into the burner interior. The inflow openings (FIGS. 5A and B) distributed in the longitudinal direction in the region of the tangential slots in the walls of the two sectional bodies now serve to inject the residual fuel RB, which is fed via the central fuel lance 5 projecting from the dome. The enriching of the lean premixture with the residual fuel RB also starts here in the zone of the inlet slots.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of supplying gaseous fuel for multiple stage premixing to a premixing burner apparatus having a main line to feed an oxygenous gas into at least one of at least one initial premixing chamber and a separate final mixing chamber, the method comprising the steps of:

supplying at least a first portion of fuel and oxygenous primary gas to at least one premixing chamber to form an incombustible premixture, wherein a concentration of the fuel in the premixture, under predetermined operating conditions of the burner, is selected so that the premixture lies outside the ignition limit for said fuel, feeding the premixture to a final mixing chamber, adding at least one of residual fuel and oxygenous secondary gas to the premixture in the final mixing chamber to form a combustible final mixture, and combusting the final mixture in a combustion zone connected downstream of the final mixing chamber.

2. The method as claimed in claim 1, further comprising the step of feeding an oxygenous tertiary gas to the combustion zone.

3. The method as claimed in claim 1, wherein said at least one premixing chambers includes a plurality of premixing chambers connected in one of series and parallel connection, the method comprising the step of feeding a first portion of fuel and oxygenous gas to each premixing chambers of said plurality of premixing chambers, wherein a plurality of premixtures are formed.

4. The method as claimed in claim 1, wherein the fuel comprises a fuel of low calorific value and the concentration of the fuel in the premixture is selected to be above the ignition limit.

5. The method as claimed in claim 1, wherein the fuel comprises a fuel of high calorific value and the concentration of the fuel in the premixture is selected to be below the ignition limit.

6. The method as claimed in claim 4, wherein a mass proportion of the fuel in the premixture is between about 50% and 100%.

7. The method as claimed in claim 5, wherein a mass proportion of the fuel in the premixture is between about 0% and 2.2%.

8. A device for multiple stage premixing of a fuel, comprising:

a housing;

at least one premixing chamber for forming an initial incombustible premixture of fuel and oxygenous gas disposed in the housing;

a premixing burner having an interior space defining a final premixing space disposed in the housing and connected to receive the initial incombustible premixture from the at least one premixing chamber to form an uncombusted final premixture;

a combustion chamber connected downstream of the premixing burner to receive the uncombusted final premixture for combustion;

the housing including means for feeding oxygenous gas into at least one of the at least one premixing chamber and the interior space of the premixing burner, first feed means for feeding fuel into the premixing chamber;

second feed means disposed inside the housing for guiding an incombustible premixture from the at least one premixing chamber into the interior space of the premixing burner; and, third feed means disposed at least partly inside the housing for feeding at least one of fuel and oxygenous gas into the interior space of the premixing burner.

9. The device as claimed in claim 8, further comprising means for feeding a flow of oxygenous gas into the combustion chamber.

10. The device as claimed in claim 8, wherein the housing has a longitudinal axis and the first feed means includes a nozzle plate arranged substantially perpendicularly to the longitudinal axis.

11. The device as claimed in claim 8, wherein the third feed means includes a plurality of discharge nozzles.

12. The device as claimed in claim 8, wherein the premixing burner is a double-cone burner comprising two hollow, conical sectional bodies nested one inside the other to define a conical interior space aligned in a longitudinal direction of flow and whose respective center axes are mutually spaced, wherein adjacent walls of the two sectional bodies form gaps for a tangential flow into the interior space, the gaps extending along the longitudinal extent of the burner, and including inflow openings disposed in the longitudinal direction in the region of the gaps between the walls of the two sectional bodies for injecting at least one of residual fuel and secondary air.

13. The device as claimed in claim 8, wherein the premixing burner is a flame holding burner for forming a stable flame at an outlet of the burner.

* * * * *